United States Patent Office 3,028,405
Patented Apr. 3, 1962

3,028,405
PROCESS OF MAKING LEAD PHENOLATE
Eric C. Juenge, Baton Rouge, La., assignor to Ethyl Corporation, New York, N.Y., a corporation of Delaware
No Drawing. Filed Apr. 6, 1959, Ser. No. 804,075
2 Claims. (Cl. 260—435)

The present invention is concerned with a method for the preparation of lead phenolate.

Attempts have been made in the past to prepare lead phenolate by the reaction of aqueous phenol with lead oxide and lead acetate. Up to this time the procedure has not been particularly successful. It is desirable to form lead phenolate from phenol and lead oxide alone since this would be the most economical route for preparing this material.

Lead phenolate is presently useful for reaction with metal alkyls to produce organolead compounds. For example, when lead phenolate is reacted with triethylaluminum, at temperatures between about 0 to 120° C., tetraethyllead is obtained. Lead phenolate is also useful as an additive to greases in order to enhance their lubrication properties. These and other uses will be evident to those skilled in the art.

An object of this invention is to provide a new and novel process for the manufacture of lead phenolate. A still further object is to provide a process for the manufacture of lead phenolate in high yield and purity.

The above and other objects of this invention are accomplished by reacting lead oxide with phenol while simultaneously removing the by-product water, preferably by azeotropic distillation. Thus, the conditions of the reaction are dictated only by the conditions required for removal of the water. While the oxide and phenol can be widely varied in amounts, ordinarily not more than about 2 percent excess of either reactant is employed. In the preferred operation, essentially stoichiometric amounts of the oxide and phenol are used.

In order to facilitate removal of water from the system a material which is steam distillable with water is employed and preferably such materials which form an azeotrope with water. Hydrocarbons are quite suitable for this purpose. In general, the main criteria of choice of such hydrocarbons are that they be liquid in addition to distilling with water and have a boiling point below about 200° C. Typical examples of such hydrocarbons include the hexanes, nonanes, decanes, octadecanes, hexenes, octenes, decenes, cyclohexane, cycloheptane, benzene, toluene, xylene, naphthalene and the like and mixed hydrocarbons as, for example, mixed xylenes or hydrocarbon streams boiling within the range of about 80° C. to 200° C. including gasoline, diesel oil, and the like. Ordinarily such hydrocarbons will contain up to and including about 18 carbon atoms. Aromatic organic solvents produce the best results and for this reason such are preferred, especially benzene and toluene.

The organic solvent employed is used in amounts sufficient to co-distill all of the by-product water formed. In general, it is usual to use at least about 10 moles of the solvent per mole of the lead oxide with best results being obtained when between 20 to 60 moles of the solvent per mole of the oxide are employed. When excesses of the solvent over the amount required to remove the water are employed and so that the product is dissolved, such is not deleterious since the product phenolate is readily recoverable by crystallization on concentration and chilling the solvent solution.

In general, the operational techniques of the process merely involve adding the lead oxide, phenol, and solvent to a distillation apparatus, then heating to the boiling point of the mixture, withdrawing vapors as formed, and passing them through a water trap in which the water is removed and the solvent is recycled to the distillation apparatus. The product then remains as a solid residue or dissolved in the solvent employed and is readily recovered by cooling and then filtering.

The present invention will be further understood by a consideration of the following example wherein all parts are by weight.

*Example I*

To an apparatus equipped with internal agitation, external heating means, a condenser and water trap was added 94.11 parts of phenol, 111.65 parts of lead monoxide and 700 parts of toluene. Agitation was commenced and the mixture heated to the reflux temperature. Water was continuously collected in the water trap and these conditions maintained until the theoretical amount of water was removed with recycling of the toluene. The residue in the distillation flask was permitted to cool whereby the precipitate formed. The resulting mixture was filtered and the white solid removed was dried. This product weighed 173.1 parts representing a yield of 88 percent. A portion of the product was re-dissolved in boiling toluene, then crystallized by cooling and filtered. The resulting crystals had a melting point of 179 to 180° C. Analysis of the product showed 36.39 percent carbon, 2.79 percent hydrogen and 53.48 percent lead, whereas lead phenolate ($C_{12}H_{10}O_2Pb$) contains 36.63 percent carbon, 2.56 percent hydrogen and 52.72 percent lead.

When the above example is repeated employing other azeotroping materials such as hexane, nonane, benzene, xylene, and the like in place of toluene and at the boiling point of the resulting mixtures, equally satisfactory results are obtained.

While the above process has been described employing lead monoxide, it is to be understood that other oxides of lead, e.g. lead dioxide, and the like can be substituted.

Having thus described the process of this invention, it is not intended that it be limited except as set forth in the following claims.

I claim:

1. A process for the manufacture of lead phenolate which comprises reacting lead oxide with phenol in the presence of a liquid hydrocarbon, said hydrocarbon having a boiling point below about 200° C. and simultaneously removing the by-product water by concurrent azeotropic distillation with said hydrocarbon.

2. A process for the manufacture of lead phenolate comprising reacting lead oxide with phenol in the presence of toluene while simultaneously removing water as an azeotrope with toluene at atmospheric pressure.

References Cited in the file of this patent
UNITED STATES PATENTS
2,680,097    Stewart _____ June 1, 1954

OTHER REFERENCES
Morton: Laboratory Technique in Organic Chemistry. McGraw-Hill, 1938, pages 9 to 12.